US011872653B2

United States Patent
Krumm et al.

(10) Patent No.: US 11,872,653 B2
(45) Date of Patent: Jan. 16, 2024

(54) DEVICE FOR ALIGNING AND POSITIONING A WORKPIECE RELATIVE TO A LASER BEAM OF A LASER PROCESSING MACHINE

(71) Applicant: Rollomatic S.A., Le Landeron (CH)

(72) Inventors: Christian Krumm, Cortébert (CH);
Pascal Schoenenberger, Bienne (CH);
José Canosa, Boudry (CH);
Mouhamad Ali Freidy, Renens (CH)

(73) Assignee: ROLLOMATIC S.A., Le Landeron (CH)

( * ) Notice: Subject to any disclaimer, the term of this patent is extended or adjusted under 35 U.S.C. 154(b) by 303 days.

(21) Appl. No.: 16/623,576

(22) PCT Filed: Sep. 4, 2018

(86) PCT No.: PCT/EP2018/073767
§ 371 (c)(1),
(2) Date: Dec. 17, 2019

(87) PCT Pub. No.: WO2019/052858
PCT Pub. Date: Mar. 21, 2019

(65) Prior Publication Data
US 2021/0146477 A1  May 20, 2021

(30) Foreign Application Priority Data
Sep. 15, 2017  (DE) .................... 10 2017 121 526.3

(51) Int. Cl.
*B23K 26/08* (2014.01)
*B23K 26/38* (2014.01)
(Continued)

(52) U.S. Cl.
CPC ...... *B23K 26/0823* (2013.01); *B23K 26/0861* (2013.01); *B23K 26/38* (2013.01); *B23K 37/053* (2013.01); *B23Q 1/4814* (2013.01)

(58) Field of Classification Search
CPC ............. B23K 26/082; B23K 26/0823; B23K 26/142; B23K 26/1438; B23K 26/0622;
(Continued)

(56) References Cited

U.S. PATENT DOCUMENTS 4,459,458 A * 7/1984 Vetsch .................. B23P 25/003
219/121.6
4,687,901 A * 8/1987 Binder ................. B23K 26/361
219/121.78
(Continued)

FOREIGN PATENT DOCUMENTS

CN  106715033 A  5/2017
CN  106984911 A  7/2017
(Continued)

OTHER PUBLICATIONS

German Search Report in DE 10 2017 121 526.3, dated Mar. 12, 2020, with English translation of relevant parts.
(Continued)

*Primary Examiner* — William J Levicky
*Assistant Examiner* — Adam M Eckardt
(74) *Attorney, Agent, or Firm* — Von Rohrscheldt Patents

(57) ABSTRACT

An apparatus for orienting and positioning a workpiece (4) relative to a laser beam (3) of a laser processing machine is proposed. The apparatus is equipped with an apparatus base (5), with a workpiece locating device (6) which receives the workpiece (4) to be machined and with a movement device (7) exhibiting at least three axes which moves the workpiece locating device (6) relative to the apparatus base (5). The movement device (7) is equipped with a rigid body (12) and
(Continued)

with a first rotary drive which generates a torque around an axis of rotation B and drives the rigid body (12) to rotate around the axis of rotation B relative to the machine base (5). On the rigid body (12) is arranged a first linear drive which displaces a first carriage (13) on the rigid body (12) along the axis Xw. On the first carriage (13) is arranged a second rotary drive (14) which generates a torque around an axis of rotation C which is different from the axis of rotation B and which drives the workpiece locating device (6) to rotate around the axis of rotation C.

11 Claims, 7 Drawing Sheets

(51) Int. Cl.
 *B23K 37/053* (2006.01)
 *B23Q 1/48* (2006.01)

(58) Field of Classification Search
 CPC .... B23K 26/08; B23K 26/123; B23K 26/147; B23K 26/384; B23K 26/389; B23K 2101/20; B23K 2103/18; B23K 26/032; B23K 26/034; B23K 26/048; B23K 26/0613; B23K 26/0624; B23K 26/0626; B23K 26/0648; B23K 26/066; B23K 26/067; B23K 26/0676; B23K 26/073; B23K 26/0861; B23K 26/0876; B23K 26/0884; B23K 26/14; B23K 26/1435; B23K 26/1436; B23K 26/1437; B23K 26/1464; B23K 26/16; B23K 26/355; B23K 26/3584; B23K 26/364; B23K 26/38; B23K 26/40; B23K 26/705; B23K 26/00; B23K 26/06; B23K 37/04; B23K 37/053; B23K 37/0408; B23K 26/02; B23K 26/035; B23K 26/36; B23K 26/70; B23K 26/064; B23K 2103/50; B23K 103/00; B23K 26/04; B21B 27/005; B21B 2267/10; B21B 27/00; B41J 2/1634; B41J 2/1603; B41J 2/1607; B41J 2/162; B41J 2/16; B08B 7/0042; B08B 7/00; B22D 11/0651; B22D 11/06; B41C 1/05; B41C 1/02; C21D 1/09; C21D 9/38; G03F 7/70041; G03F 7/70725; G06K 1/126; H01L 21/02532; H01L 21/0268; H01L 21/02686; H01L 21/02691; H01L 27/1285; H01L 27/1296; H01L 29/04; H01L 21/20; H04N 1/40037; H04N 1/40; H05K 3/0026; G01B 11/24; B23Q 1/4814; G05D 1/0858; G05D 1/08; A61K 48/00; C07K 14/46; C07K 14/62; B23B 47/287; B23B 27/20; B23C 2226/125; B23C 2226/315; B23C 2260/56; B23D 65/02; B28B 23/043; Y10T 407/27; B23P 15/28; B23P 23/04
 See application file for complete search history.

(56) References Cited

U.S. PATENT DOCUMENTS

| | | | | |
|---|---|---|---|---|
| 5,239,160 A * | 8/1993 | Sakura | ............... | B23K 26/0884 269/71 |
| 5,391,856 A * | 2/1995 | Minamida | .......... | B22D 11/0651 219/121.68 |
| 5,855,149 A * | 1/1999 | Islam | .............. | C23C 24/10 76/115 |
| 5,932,119 A * | 8/1999 | Kaplan | .............. | B23K 26/06 219/121.68 |
| 5,960,379 A * | 9/1999 | Shimizu | .............. | G01M 11/0271 702/155 |
| 6,178,852 B1 * | 1/2001 | Pfaff | .............. | B23P 15/406 219/121.85 |
| 6,281,473 B1 * | 8/2001 | Wright, III | .......... | C21D 10/005 219/121.84 |
| 6,380,512 B1 * | 4/2002 | Emer | .............. | F01D 5/005 219/121.85 |
| 6,384,370 B1 * | 5/2002 | Tsunemi | .............. | B23K 26/0884 219/121.69 |
| 6,622,906 B1 * | 9/2003 | Kushibe | .............. | B23K 37/04 228/49.2 |
| 6,723,951 B1 * | 4/2004 | McGraw | .............. | B23K 26/04 219/121.71 |
| 7,827,883 B1 * | 11/2010 | Cherng | .............. | B23P 15/406 219/76.1 |
| 7,923,659 B2 | 4/2011 | Arai et al. | | |
| 8,698,038 B2 * | 4/2014 | Luce | .............. | B23K 9/044 175/375 |
| 8,872,065 B2 * | 10/2014 | Pluss | .............. | B23K 26/082 219/121.78 |
| 8,893,576 B2 * | 11/2014 | Takeda | .............. | B25J 9/026 74/490.02 |
| 9,144,838 B2 * | 9/2015 | Shan | .............. | B22C 9/12 |
| 9,415,466 B2 * | 8/2016 | Nakamae | .............. | B23K 26/064 |
| 9,772,182 B2 * | 9/2017 | Am Weg | .......... | G01B 11/2441 |
| 10,308,039 B2 * | 6/2019 | Mathis | .............. | B41J 2/442 |
| 10,678,206 B2 * | 6/2020 | Quitter | .............. | B23K 26/032 |
| 10,695,869 B2 | 6/2020 | Pluss et al. | | |
| 2002/0143435 A1 | 10/2002 | Terada et al. | | |
| 2002/0162825 A1 * | 11/2002 | Lizotte | .............. | B23K 26/043 219/121.73 |
| 2003/0014895 A1 * | 1/2003 | Lizotte | .............. | B23K 26/066 42/1.01 |
| 2003/0070468 A1 * | 4/2003 | Butscher | .............. | G16H 30/40 72/295 |
| 2004/0140300 A1 * | 7/2004 | Yoshikawa | .......... | B23K 26/142 219/121.84 |
| 2004/0164061 A1 * | 8/2004 | Takeuchi | ........... | B23K 26/0624 219/121.73 |
| 2005/0045598 A1 * | 3/2005 | Even | .............. | C21D 10/005 219/121.6 |
| 2006/0037951 A1 * | 2/2006 | Otsuka | .............. | B23K 26/0884 219/121.78 |
| 2009/0196699 A1 * | 8/2009 | Elfizy | .............. | B23K 26/0823 408/1 R |
| 2009/0199690 A1 * | 8/2009 | Sun | .............. | B25J 9/1664 901/41 |
| 2010/0106285 A1 * | 4/2010 | Massey | .............. | B25J 9/1694 901/42 |
| 2010/0126642 A1 * | 5/2010 | Brenner | .............. | C21D 1/09 148/567 |
| 2011/0168679 A1 * | 7/2011 | Qi | .............. | B23K 26/36 219/121.64 |
| 2011/0220625 A1 * | 9/2011 | Pluss | .............. | B23K 26/0823 219/121.72 |
| 2011/0297654 A1 * | 12/2011 | Yoshikawa | .......... | B23K 26/046 219/121.81 |
| 2012/0281239 A1 * | 11/2012 | White | .............. | G01N 21/9515 356/601 |
| 2013/0043225 A1 * | 2/2013 | Schurmann | .......... | B23K 26/044 219/121.64 |
| 2014/0054275 A1 * | 2/2014 | Nakamae | .............. | B23K 26/38 219/121.72 |
| 2014/0124483 A1 * | 5/2014 | Henn | .............. | B23K 26/342 219/76.1 |
| 2014/0291307 A1 * | 10/2014 | Saegmueller | ........ | B23K 26/361 219/121.72 |
| 2016/0076115 A1 * | 3/2016 | Zeng | .............. | C21D 1/70 266/249 |
| 2016/0114378 A1 * | 4/2016 | Riemeier | .............. | B21F 45/008 72/369 |
| 2016/0129528 A1 * | 5/2016 | Hyatt | .............. | B23K 26/0884 219/76.12 |

(56) References Cited

U.S. PATENT DOCUMENTS

| | | | | |
|---|---|---|---|---|
| 2017/0008127 | A1* | 1/2017 | Hyatt | B23K 26/1482 |
| 2017/0083001 | A1* | 3/2017 | Kung | B23K 26/0884 |
| 2017/0113304 | A1* | 4/2017 | Pluss | B23K 26/0861 |
| 2017/0320164 | A1* | 11/2017 | Shin | B23K 26/0093 |
| 2018/0141174 | A1* | 5/2018 | Mori | B23K 26/34 |
| 2018/0161926 | A1* | 6/2018 | Yang | B23K 26/0608 |
| 2019/0094010 | A1* | 3/2019 | Demiter | G01B 7/008 |
| 2019/0389068 | A1* | 12/2019 | Shimizu | B25J 9/1697 |
| 2020/0238516 | A1* | 7/2020 | Maeda | B23K 26/38 |
| 2021/0146477 | A1* | 5/2021 | Krumm | B23K 26/38 |
| 2022/0161358 | A1* | 5/2022 | Nakai | B23Q 3/02 |

FOREIGN PATENT DOCUMENTS

| | | |
|---|---|---|
| DE | 200 01 747 U1 | 4/2000 |
| DE | 10 2014 109 613 A1 | 9/2014 |
| EP | 0 244 645 A1 | 11/1987 |
| EP | 2 374 569 A2 | 10/2011 |
| EP | 2 636 478 A1 | 9/2013 |
| JP | 2005-524533 A | 8/2005 |
| JP | 2012-110963 A | 6/2012 |
| JP | 2013-091095 A | 5/2013 |
| JP | 2017-524534 A | 8/2017 |
| TW | I406728 B | 9/2013 |
| WO | 2007/091155 A1 | 8/2007 |

OTHER PUBLICATIONS

International Search Report in PCT/EP2018/073767, dated Nov. 15, 2018.
Taiwanese Office Action dated Jun. 29, 2021 in Taiwanese Application No. 107132436 with English translation.
Japanese Office Action dated Mar. 3, 2021, with Search Report and English Translation, in Japanese Application No. 2020-505223.
Korean Office Action dated May 18, 2022 in Korean Application No. 10-2020-7002618 with English translation.

* cited by examiner

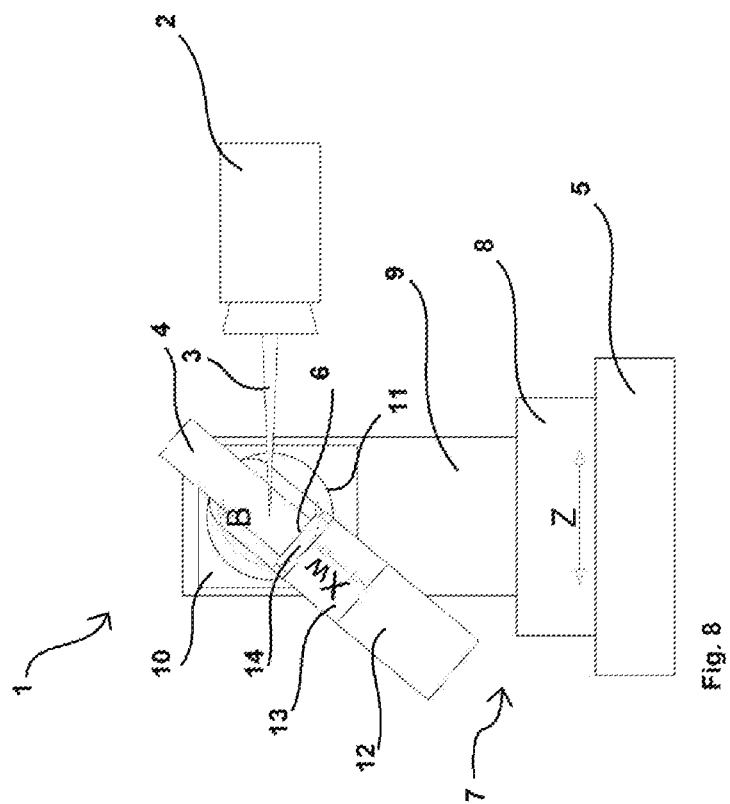
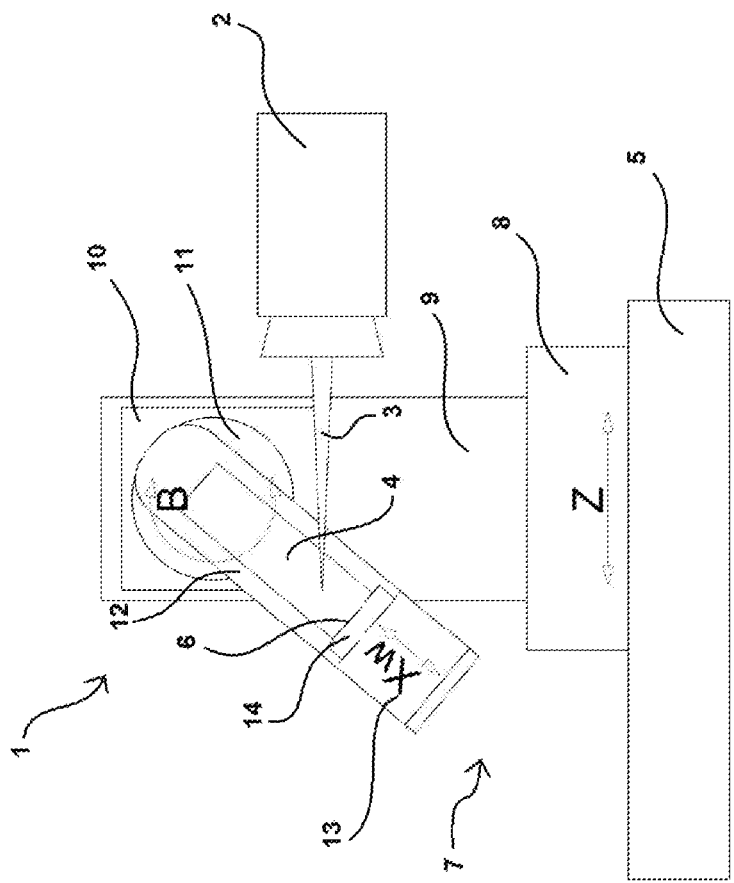

DEVICE FOR ALIGNING AND POSITIONING A WORKPIECE RELATIVE TO A LASER BEAM OF A LASER PROCESSING MACHINE

CROSS REFERENCE TO RELATED APPLICATIONS

This application is the National Stage of PCT/EP2018/073767 filed on Sep. 4, 2018, which claims priority under 35 U.S.C. § 119 of German Application No. 10 2017 121 526.3 filed on Sep. 15, 2017, the disclosure of which is incorporated by reference. The international application under PCT article 21(2) was not published in English.

BACKGROUND OF THE INVENTION

1. Field of the Invention

The invention relates to an apparatus for orienting and positioning a workpiece relative to a laser beam of a laser processing machine.

2. Description of the Related Art

The machining of workpieces by means of short, intensive laser pulses is known. Laser radiation at high power density causes the material on the surface of the workpiece to heat up. Depending on the power density, plasma may form on the surface of the workpiece. Material is removed from the surface of the workpiece in the process. This is referred to as laser ablation.

The laser beam and workpiece are moved relative to each other in a defined manner in order to remove material in a targeted manner within defined sections of the workpiece and to give the surface of the workpiece particular contours. This process includes producing blades on workpieces. They are also referred to as cutting edges.

A laser processing machine is equipped with a laser head which directs the pulsed laser beam of a laser onto a workpiece in a targeted manner and moves this beam over the surface of a workpiece, where applicable within a predefined pulse contour. The workpiece is arranged in an apparatus for orienting and positioning which in the case of a machine tool is also referred to as a clamping device. This apparatus is equipped with an apparatus base, a workpiece locating device and a movement device. The apparatus base is arranged in a fixed position. It can be part of the machine base of the laser processing machine. The workpiece locating device picks up the workpiece and clamps it tightly, so that the position of the workpiece relative to the workpiece locating device does not change while the workpiece is being machined. The movement device assures a movement of the workpiece locating device relative to the apparatus base. Since the laser head of the laser processing machine is generally arranged in a fixed position relative to the apparatus base, the movement device thus also assures a relative movement between the laser head on the one hand and the workpiece locating device on the other. Accordingly, a workpiece clamped in the workpiece locating device is thereby moved relative to a laser beam generated by the laser head. The relative movement triggered by the movement device means that a workpiece can thus be machined over its entire surface, unless the workpiece surface is covered by the workpiece locating device. In the machining process the workpiece is oriented with its surface at various angles against the laser beam.

Known apparatuses for arranging and orienting workpieces exhibit a movement device with a plurality of axes. The movement correspondingly exhibits a plurality of degrees of freedom. In order to execute the movement, the movement device is equipped with a plurality of translational and rotary drives. Movement devices with six axes generally exhibit three translational drives which generate linear driving forces along an X axis, a Y axis and a Z axis, and three rotary drives which generate a torque around a DX axis, a DY axis and a DZ axis respectively. Translational drives are also referred to as linear drives. Movement devices with fewer than six axes exhibit a correspondingly lower number of translational or rotary drives. In order to coordinate the movements of the drives with each other, the drivers are controlled by means of a common control unit. The drives are generally CNC controlled.

If elongated workpieces from which for instance drills or millers are manufactured are machined, and if on the basis of its area of application the workpiece exhibits a great axial length of multiple decimeters, the distances around which the movement device must move the workpiece locating device and a workpiece clamped in it are considerable. In particular, the individual translational and rotary drives move the carriages, brackets or other driven parts assigned to them over great distances. When distances are great, great acceleration is generally necessary. Great acceleration is a disadvantage, however, because it requires the drives to generate great driving forces or torques.

SUMMARY OF THE INVENTION

The invention is based on the task of providing an apparatus for arranging and orienting a workpiece that enables workpieces with a great axial length to be moved relative to a laser beam, so that the workpiece can be machined essentially on its entire surface without the need for great acceleration and great driving forces or torques of the associated drives.

This task is solved by an apparatus according to the invention. The apparatus is characterized in that the movement device is equipped with a first rotary drive with an axis of rotation B, a first linear drive with a linear axis Xw, which runs essentially radial to the axis of rotation B, and a second rotary drive with an axis of rotation C which is different from B. The movement device exhibits a rigid body. With its torque the first rotary drive drives the rigid body to rotate around the axis of rotation B relative to the machine base, whereby the rigid body protrudes radially outwards from the axis of rotation B. The first linear drive is arranged on the rigid body. The first linear drive generates a linear driving force along an axis Xw running radially to the axis B and thereby displaces a first carriage along the axis Xw on the surface of the rigid body. The second rotary drive is arranged on the first carriage. With its torque the second rotary drive drives the workpiece locating device to rotate around the axis of rotation C relative to the apparatus base.

The workpiece locating device picks up one end of an elongated workpiece and clamps this end. For that purpose the workpiece locating device exhibits an elongated workpiece mount which extends along a linear workpiece mount axis. The workpiece locating device is preferably arranged on the second rotary drive such that the workpiece mount axis runs coaxially to the axis of rotation C. If a workpiece with its workpiece longitudinal axis is arranged coaxially to the workpiece mount axis in the workpiece locating device, the second rotary drive assures a rotation of the workpiece around its longitudinal axis.

The first linear drive enables a displacement of a workpiece arranged in the workpiece locating device. The displacement is preferably in a direction in which the surface of the workpiece is to be machined. Thus the linear axis Xw can, for instance, run parallel to the axis of rotation C. In this case a workpiece clamped in the workpiece locating device can be displaced along its longitudinal axis. The same applies for workpieces which exhibit a great axial elongation of multiple decimeters. In this manner the workpiece can be oriented with its entire surface to the laser beam simply by a movement along the linear axis Xw and around the axis of rotation C successively, so that the entire surface can be machined with the laser. A rotation around the axis of rotation B also assures an orientation of the workpiece at various angles relative to the laser beam.

The apparatus according to the invention thus enables an orientation of the workpiece in which no great distances have to be covered between the individual machining steps. The same applies for the rigid body, which is moved with the first rotary drive, for the first carriage, which is moved with the first linear drive, and for the locating device, which is moved with the second rotary drive. The adjustment paths of the components which are assigned to the first linear drive and the second rotary drive are short. The apparatus according to the invention thus requires no great acceleration and no great forces or torques.

According to an advantageous embodiment of the invention, the axis C runs on a plane perpendicular to the axis B.

According to a further advantageous embodiment of the invention, the axis C is parallel to the axis Xw.

According to a further advantageous embodiment of the invention, the rigid body has an elongated form and extends along a longitudinal axis. The rigid body is mounted on the first rotary drive such that its longitudinal axis runs in a radial direction to the axis of rotation B.

According to a further advantageous embodiment of the invention, the rigid body takes the form of a lever. A one-armed lever is particularly preferable as the lever. It preferably extends along the linear displacement path of the first carriage and supports said carriage in its movement. The lever can take the form of an elongated arm.

According to a further advantageous embodiment of the invention, parallel to the linear axis Xw the rigid body is equipped with a guide rail along which the first carriage is led. The guide rail assures that the first carriage is supported in its movement along the linear axis Xw.

According to a further advantageous embodiment of the invention, the movement device exhibits a second linear drive which generates a driving force along a linear axis Z and moves a second carriage along the axis Z relative to the machine base. The first rotary drive is preferably arranged directly or indirectly on the second carriage such that the combination of the first rotary drive, the first linear drive, the second rotary drive and the locating device together can be displaced along the axis Z relative to the apparatus base and hence relative to a laser beam. The axis Z preferably runs parallel to the beam axis of the laser beam of the laser processing machine. The second linear drive can be arranged on the machine base. However, it is also possible to arrange the second linear motor on the second carriage. The second linear drive can also take the form of a linear motor, whereby the stator is connected to the apparatus base and the rotor to the second carriage.

According to a further advantageous embodiment of the invention, the movement device exhibits a third linear drive arranged on the second carriage, which drive generates a driving force along a linear axis Y and moves a third carriage along the axis Y relative to the second carriage, whereby the axis Y is different from the axis Z. Thus the third carriage is also displaced along the axis Y relative to the machine base. The third linear drive can be arranged on the second carriage. Alternatively, the third linear drive can be arranged on the third carriage. The third linear drive can also take the form of a linear motor, whereby the stator is connected to the second carriage and the rotor to the third carriage, or vice versa.

According to a further advantageous embodiment of the invention, the movement device exhibits a fourth linear drive arranged on the third carriage, which drive generates a driving force along a linear axis X and moves a fourth carriage along the axis X relative to the third carriage, whereby the axis X is different from the axis Z and from the axis Y. The first rotary drive is preferably arranged on the fourth carriage such that the combination of the first rotary drive, the first linear drive, the second rotary drive and the locating device together can be displaced along the axes Z, Y and X relative to the apparatus base and hence relative to a laser beam. In this case the movement of the movement device exhibits four translational and two rotational degrees of freedom. The movement takes place along the four linear axes Z, Y, X and Xw and along the two axes of rotation B and C. The fourth linear drive can be arranged on the third carriage. Alternatively, the fourth linear drive can be arranged on the fourth carriage. The fourth linear drive can also take the form of a linear motor, whereby the stator is connected to the third carriage and the rotor to the fourth carriage, or vice versa.

According to a further advantageous embodiment of the invention, the axes X, Y and Z are perpendicular to one another.

According to a further advantageous embodiment of the invention, the first rotary drive is arranged on the fourth carriage.

According to a further advantageous embodiment of the invention, the axis B is essentially parallel to one of the axes X, Y or Z.

According to a further advantageous embodiment of the invention, the drives of all axes are controlled by CNC. The control assures that all drives are coordinated with each other and that the workpiece is oriented by the movement of the drives exactly in a predefined chronological order relative to the laser beam 3 in order to produce a desired contour on the surface of the workpiece.

Further advantages and advantageous embodiments of the invention can be obtained from the following description, the drawing and the claims.

BRIEF DESCRIPTION OF THE DRAWINGS

The drawing shows a model embodiment of the apparatus according to the invention which is described below. Illustrations.

DETAILED DESCRIPTION OF THE PREFERRED EMBODIMENTS

Figure 1:
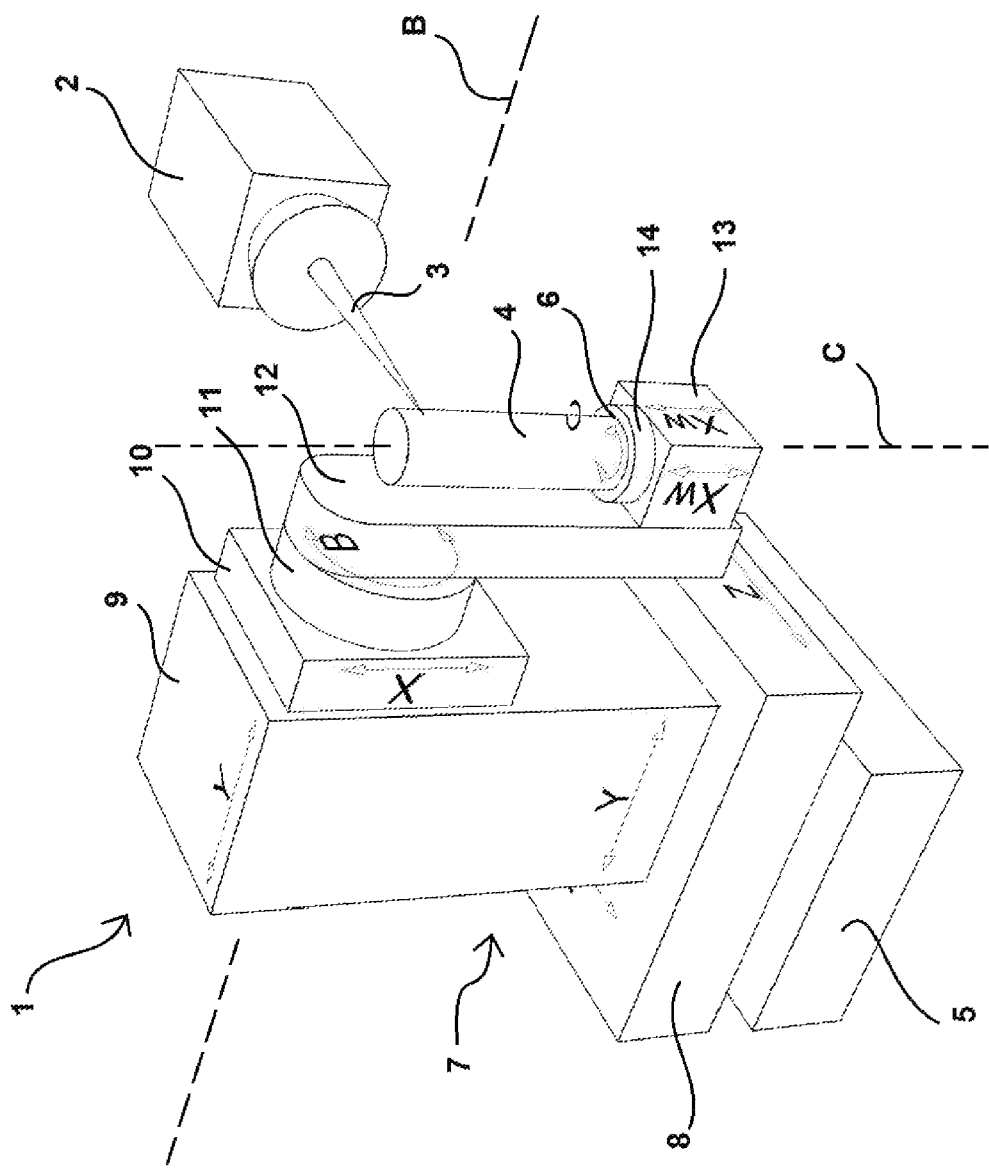
FIG. 1 Perspective representation of an apparatus for orienting and positioning, whereby the rigid body is oriented perpendicularly downwards and the first carriage is in its position furthest from the axis of rotation B FIG. 2 Apparatus according to FIG. 1 in a perspective representation, whereby the first carriage is arranged in a position closer to the axis of rotation B than in FIG. 1

In FIGS. 1 to 11 an apparatus for orienting and positioning 1 a workpiece 4 relative to a laser beam 3 is represented. The laser beam is directed by a laser head 2 of a laser processing machine not represented further onto the surface of the workpiece 4. The apparatus for orienting and positioning 1 exhibits an apparatus base 5 arranged in a fixed manner, a workpiece locating device 6 which picks up and clamps the workpiece 4, and a movement device 7. The movement device moves the workpiece locating device 6 around two axes of rotation B and C and along four linear axes Xw, X, Y and Z relative to the apparatus base 5. A second linear drive not represented in the drawing moves a second carriage 8 back and forth along the axis Z relative to the apparatus base. A third linear drive not represented in the drawing moves a third carriage 9 back and forth along the axis Y relative to the second carriage 8. A fourth linear drive not represented in the drawing moves a fourth carriage 10 back and forth along the axis X relative to the third carriage 9. On the fourth carriage 10 is arranged a first rotary drive 11 which generates a torque around an axis B which runs parallel to the axis Y and perpendicular to the axes X and Z. A drive shaft, not identifiable in the drawing, of the first rotary drive 11 is non-rotatably connected to the rigid body 12, which has the form of a one-armed lever. The rigid body 12 protrudes radially outwards from the axis of rotation B. The drive shaft transmits the torque of the first rotary drive 11 to the rigid body 12 and thus assures a rotation of the rigid body 12 around the axis of rotation B. On the rigid body 12 is arranged a first linear drive, not represented in the drawing, which generates a linear driving force along the linear axis Xw and moves a first carriage 13 back and forth along the axis Xw. The axis Xw runs in a radial direction to the axis of rotation B. The axis Xw extends on a plane perpendicular to the axis of rotation B. A second rotary drive 14 is arranged on the first carriage 13. It generates a torque around an axis of rotation C. The axis of rotation C is parallel to the linear axis Xw. The axis of rotation runs on a plane perpendicular to the axis of rotation B. The second rotary drive rotates the workpiece locating device 6 and thus the workpiece 4 received in the workpiece locating device 6 around the axis of rotation C.

The laser beam 3 is oriented with its beam axis parallel to the linear axis Z. A displacement of the second carriage along the axis Z thus leads to a movement of the workpiece locating device 6 towards the laser head 2 or away from it. The distance of the workpiece 4 to the laser head 2 can be adjusted by means of the second linear drive and a movement of the second carriage 8.

The workpiece 4 is elongated. It is received in the workpiece locating device 6 such that a longitudinal axis of the workpiece 4 runs coaxially to the axis of rotation C. The second rotary drive 14 thus assures a rotation of the workpiece 4 around its own longitudinal axis.

Figure 3:
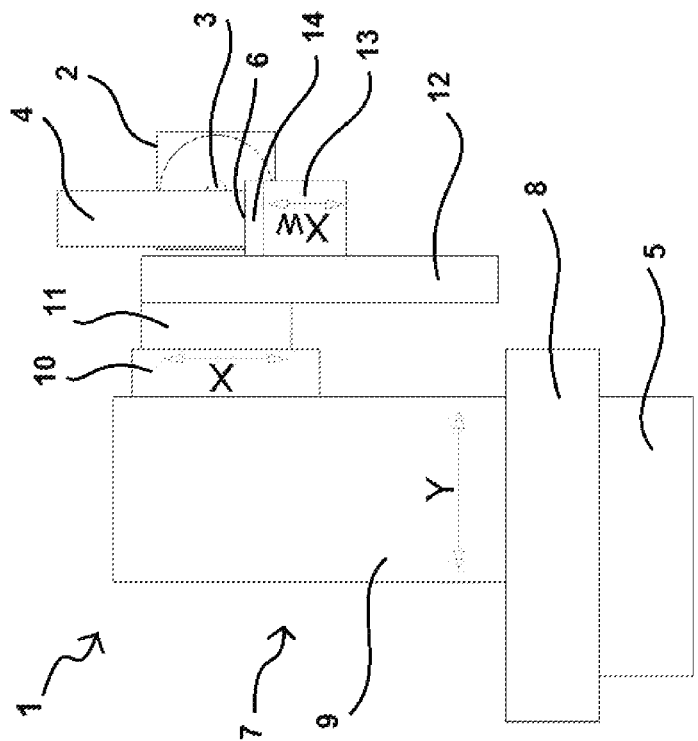
FIG. 3 Apparatus according to FIG. 1 in a position of the movement device according to FIG. 1 in a view from the front FIG. 4 Apparatus according to FIG. 1 in a position of the movement device according to FIG. 2 in a view from the front FIG. 5 Apparatus according to FIG. 1 in a position of the movement device according to FIG. 1 in a view from the side FIG. 6 Apparatus according to FIG. 1 in a position of the movement device according to FIG. 2 in a view from the side FIG. 7 Apparatus according to FIG. 1 in a view from the side, whereby the rigid body is turned clockwise around an angle of 45° from the position in FIG. 1 and the first carriage is in its position furthest from the axis of rotation B FIG. 8 Apparatus according to FIG. 1 in a view from the side, whereby the rigid body is turned clockwise around an angle of 45° from the position in FIG. 1 and the first carriage is arranged in a position closer to the axis of rotation B than in FIG. 7
Figure 5:
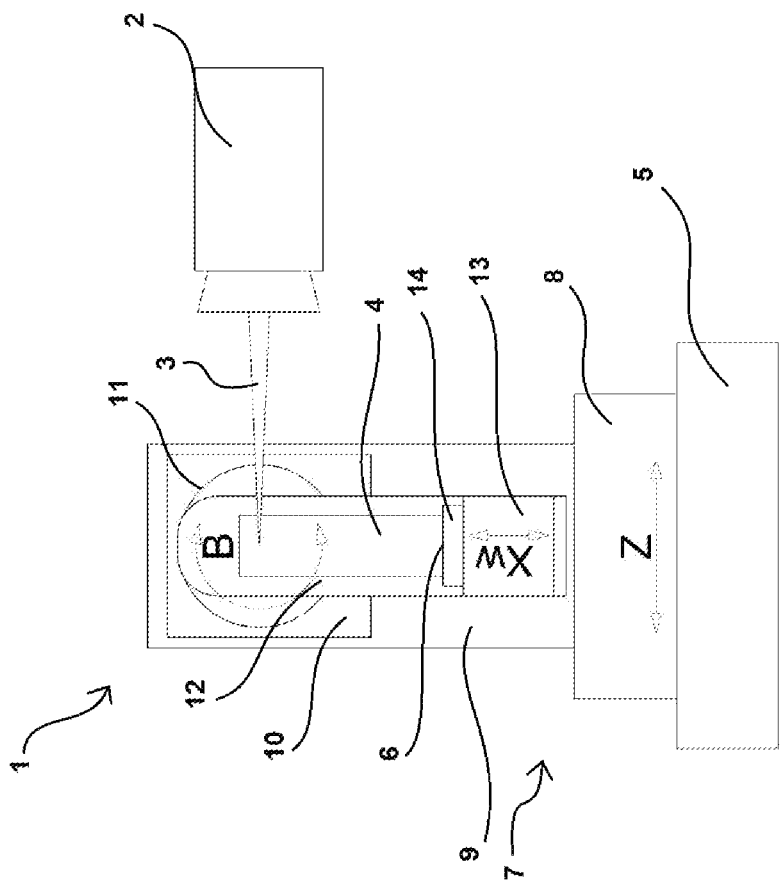

In FIGS. 1, 3 and 5 the movement device 7 is oriented in such a way that the rigid body 12 points vertically downwards and the first carriage 13 is located in its position at the furthest remove from the axis of rotation B. In this position the workpiece 4 can be machined at its end facing away from the workpiece locating device 6.

Figure 2:
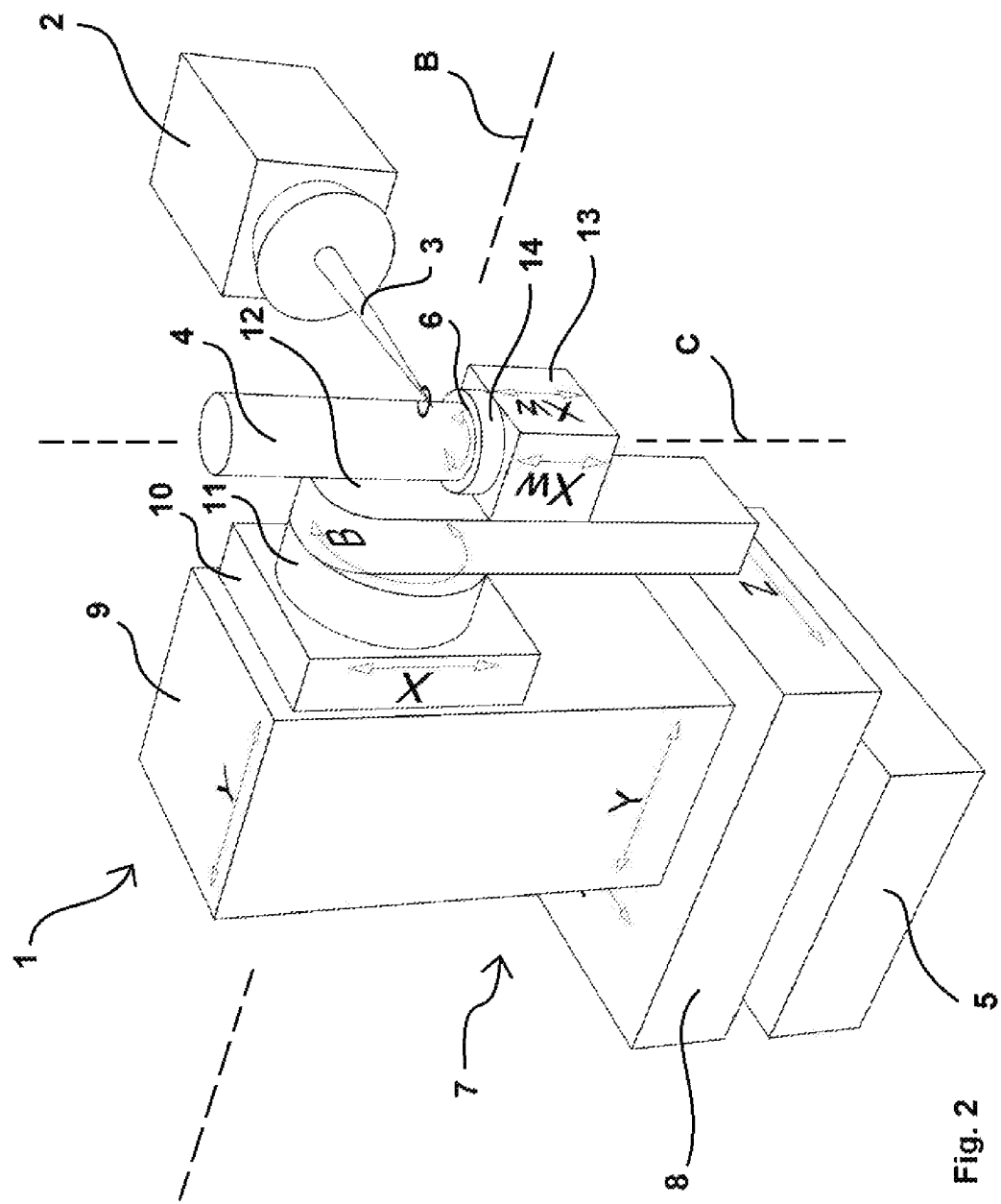
Figure 4:
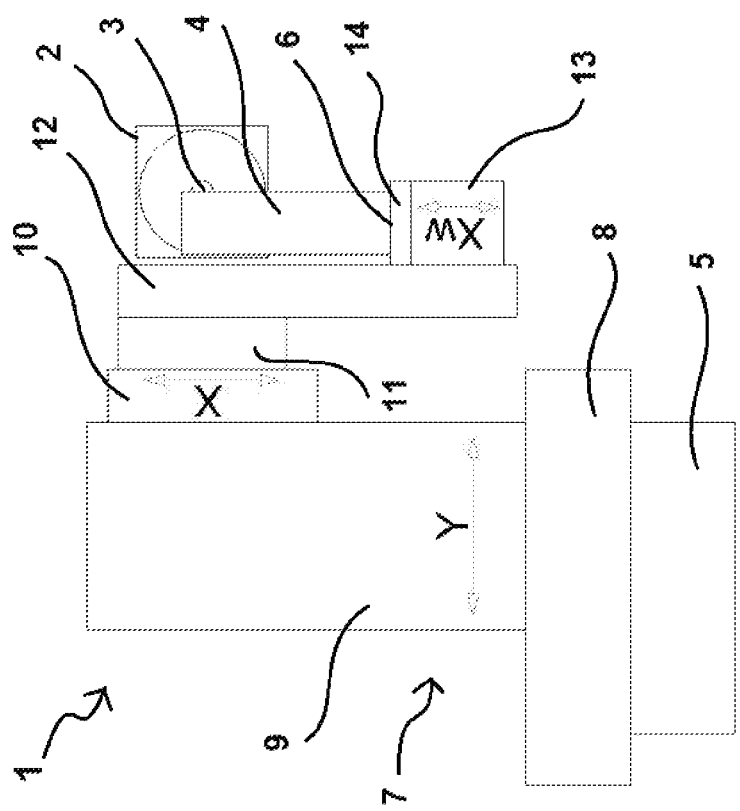
Figure 6:
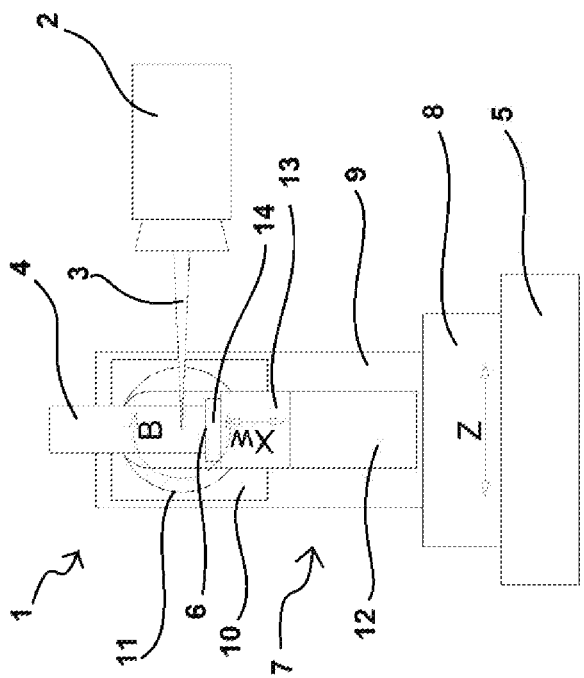

In FIGS. 2, 4 and 6 the movement device 7 is oriented in such a way that the rigid body 12 points vertically downwards and the first carriage 13 is located in a position that is closer to the axis of rotation B compared with the position according to FIGS. 1, 3 and 5. In this position of the first carriage the workpiece 4 can be machined with the laser at its end facing the workpiece locating device 6.

From the comparison of the two positions represented in FIGS. 1, 3 and 5 on the one hand and in FIGS. 2, 4 and 6 on the other, it is evident that the displacement path which the first carriage 13 covers along the linear axis Xw essentially corresponds to that distance along the longitudinal axis of the workpiece 4 over which the workpiece surface is to be machined with the laser beam 3. It is further evident from the representation of the apparatus 1 in a view from above according to FIG. 11 together with FIGS. 1 to 6 that a rotation of the workpiece 4 around the axis of rotation C and a translation along the linear axis Xw enable the surface of the workpiece 4 to be oriented to the laser beam 3 over a distance which is predefined by the displacement path along the axis Xw such that the entire surface of the workpiece 4 can be machined.

Figure 10:
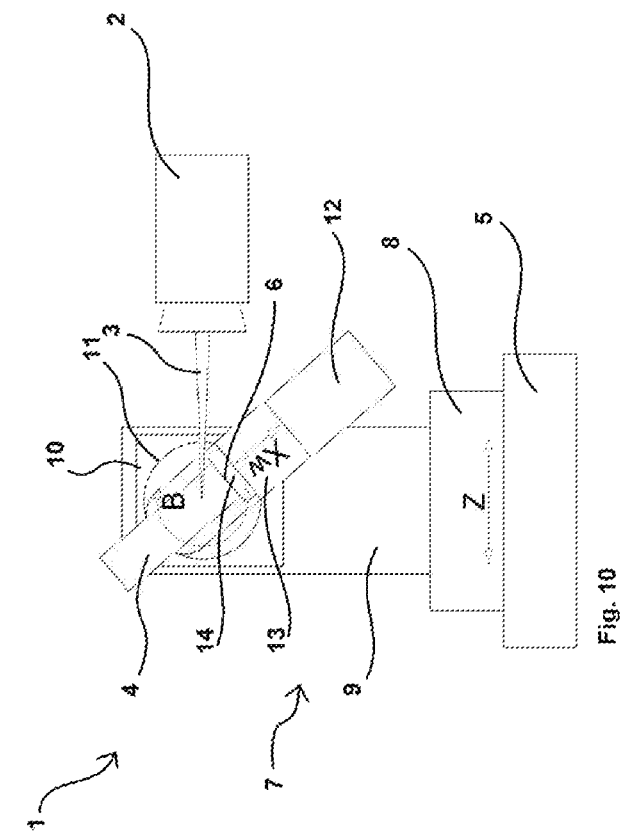
Figure 9:
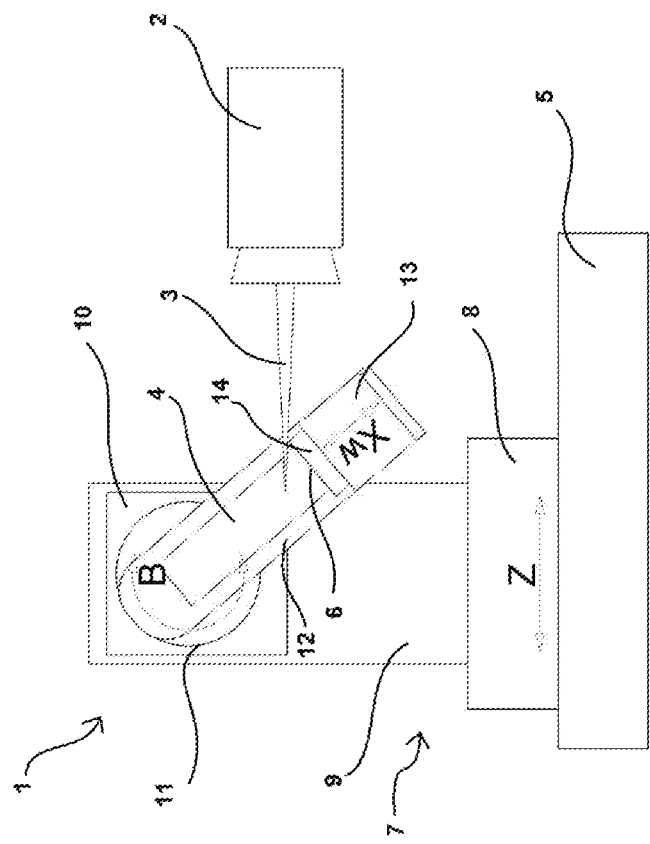
FIG. 9 Apparatus according to FIG. 1 in a view from the side, whereby the rigid body is turned anticlockwise around an angle of 45° from the position in FIG. 1 and the first carriage is in its position furthest from the axis of rotation B FIG. 10 Apparatus according to FIG. 1 in a view from the side, whereby the rigid body is turned anticlockwise around an angle of 45° from the position in FIG. 1 and the first carriage is arranged in a position closer to the axis of rotation B than in FIG. 7

FIGS. 7 to 10 represent various positions of the rigid body 12, whereby FIGS. 7 and 8 show a rigid body 12 rotated clockwise around an angle of 45° compared with FIGS. 1 to 6. FIGS. 9 and 10 show the rigid body 12 in a position rotated anticlockwise around an angle of 45° compared with FIGS. 1 to 6. In FIGS. 7 and 9 the first carriage 13 is located in its position at the greatest possible distance from the axis of rotation B. In FIGS. 8 and 10, however, the first carriage 13 exhibits a position which is closer to the axis of rotation B. The representations show that the angle between the surface of the workpiece 4 and the laser beam 3 can be adjusted by means of a rotation of the rigid body 12 around the axis of rotation B.

In FIGS. 1 to 6 the rigid body 12 is oriented parallel to the linear axis X. In this position the linear axis Xw and the linear axis X are parallel to one another. In this position the workpiece 4 can be oriented to the laser beam parallel to the workpiece longitudinal axis not only by means of a translation along the axis Xw but also by a translation over a distance along the axis X. The positions of the rigid body 12 according to FIGS. 7 to 10, however, show that a corresponding adjustment of the workpiece parallel to the longitudinal axis over a distance by means of the axis X alone is no longer possible if the workpiece 4 is rotated around the axis of rotation B. Here the translation along the linear axis Xw leads to a considerable simplification.

Figure 11:
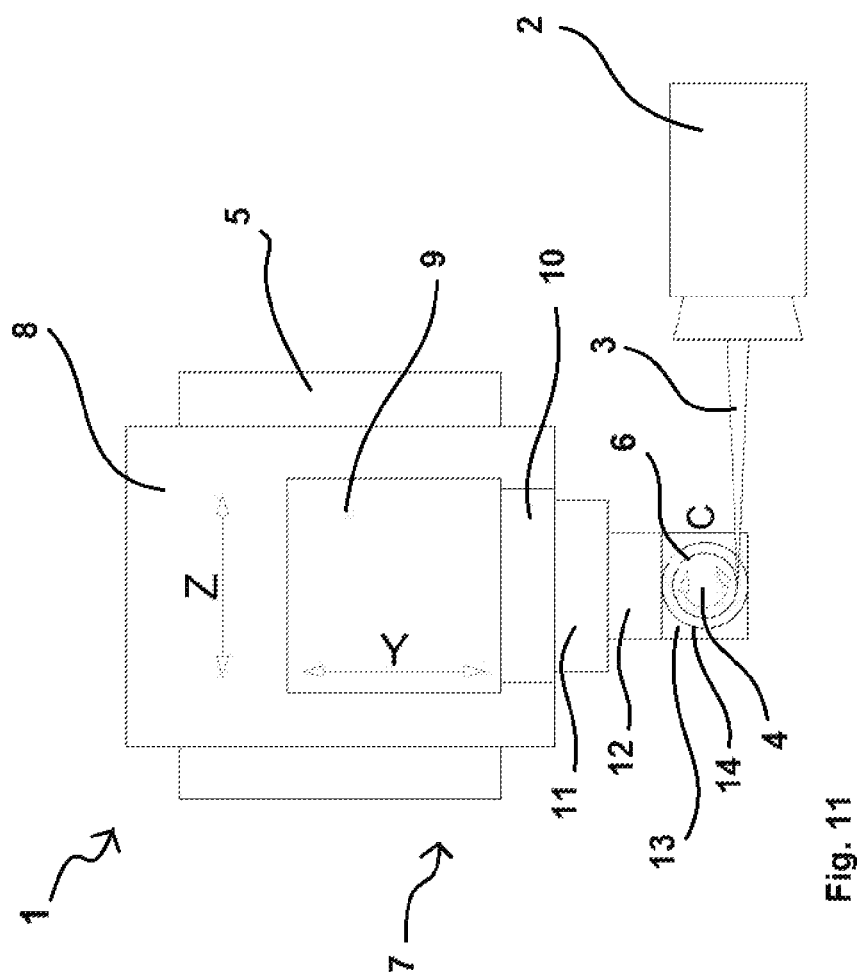
FIG. 11 Apparatus according to FIG. 1 in the position of the movement device according to FIG. 1 in a view from above

FIG. 11 shows the apparatus 1 with the laser head 2, the laser beam 3 and the workpiece 4 from above. The representation shows that a movement of the third carriage 9 along the linear axis Y can be executed to determine whether the laser beam 3 meets the surface of the workpiece 4 at the edge of the workpiece in an essentially tangential or rather central and hence rather radial position relative to the longitudinal axis of the workpiece or in a position between these.

The drives are controlled by means of a common control such that the workpiece 4 is moved in a targeted manner relative to the laser beam 3, so that a predefined surface contour is produced by laser ablation. The control is a CNC control. The control is not represented in the drawing.

All features of the invention can be material to the invention both individually and in any combination.

REFERENCE NUMBERS

1 Apparatus for positioning and orienting a workpiece
2 Laser head
3 Laser beam
4 Workpiece
5 Apparatus base
6 Locating device
7 Movement device
8 Second carriage
9 Third carriage
10 Fourth carriage
11 First rotary drive
12 Rigid body
13 First carriage
14 Second rotary drive

What is claimed is:

1. An apparatus for orienting and positioning a workpiece relative to a laser beam of a laser head that laser machines the workpiece, the apparatus comprising:
    an apparatus base;
    the laser head mounted at the apparatus base;
    a workpiece locating device which receives the workpiece to be laser machined by the laser beam while the workpiece locating device including the workpiece is movable about 6 axes in 4 linear degrees of freedom and 2 rotational degrees of freedom relative to the laser head; and
    a movement device having at least three axes which moves the workpiece locating device relative to the apparatus base, the movement device including
    a rigid body;
    a first carriage disposed on and disposable along the rigid body;
    a first rotary drive which generates a torque around an axis of rotation B and drives the rigid body to rotate around the axis of rotation B relative to the apparatus base, whereby the rigid body protrudes radially outwards from the axis of rotation;
    a first linear drive arranged on the rigid body which generates a linear driving force along a linear axis Xw of the rigid body running radially to the axis of rotation B and displaces the first carriage on the rigid body along the linear axis Xw on the rigid body so that an intersection point between a workpiece rotation axis C and the axis of rotation B remains constant when the rigid body rotates about the axis of rotation B and the first carriage moves along the linear axis Xw in a fourth linear degree of freedom of the 4 linear degrees of freedom; and
    a second rotary drive arranged on the first carriage, wherein the second rotary drive generates a torque around the workpiece rotation axis C differing from the axis of rotation B and drives the workpiece locating device to rotate around the workpiece rotation axis C.

2. The apparatus according to claim 1, wherein the workpiece rotation axis C runs on a plane perpendicular to the axis of rotation B.

3. The apparatus according to claim 1, wherein the workpiece rotation axis C is parallel to the linear axis Xw.

4. The apparatus according to claim 1, wherein the rigid body takes the form of a lever.

5. The apparatus according to claim 1, wherein the movement device comprises a second linear drive which generates a driving force along a linear axis Z in a third linear degree of freedom of the 4 linear degrees of freedom and moves a second carriage along the linear axis Z relative to the machine base.

6. The apparatus according to claim 5, wherein the movement device comprises a third linear drive which generates a driving force along a linear axis Y in a second linear degree of freedom of the 4 linear degrees of freedom and moves a third carriage along the linear axis Y relative to the second carriage, whereby the linear axis Y is different from the axis Z.

7. The apparatus according to claim 6, wherein the movement device comprises a fourth linear drive which generates a driving force along a linear axis X in a first linear degree of freedom of the 4 linear degrees of freedom and moves a fourth carriage along the linear axis X relative to the third carriage, whereby the linear axis X is different from the linear axis Z and from the linear axis Y.

8. The apparatus according to claim 7, wherein the linear axes X, Y and Z are perpendicular to one another.

9. The apparatus according to claim 7, wherein the first rotary drive is arranged on the fourth carriage.

10. The apparatus according to claim 5, wherein the axis of rotation B is parallel to one of the axes linear X, Y or Z.

11. The apparatus according to claim 1, wherein the drives of all axes are controlled by CNC.

* * * * *